Figure 1:
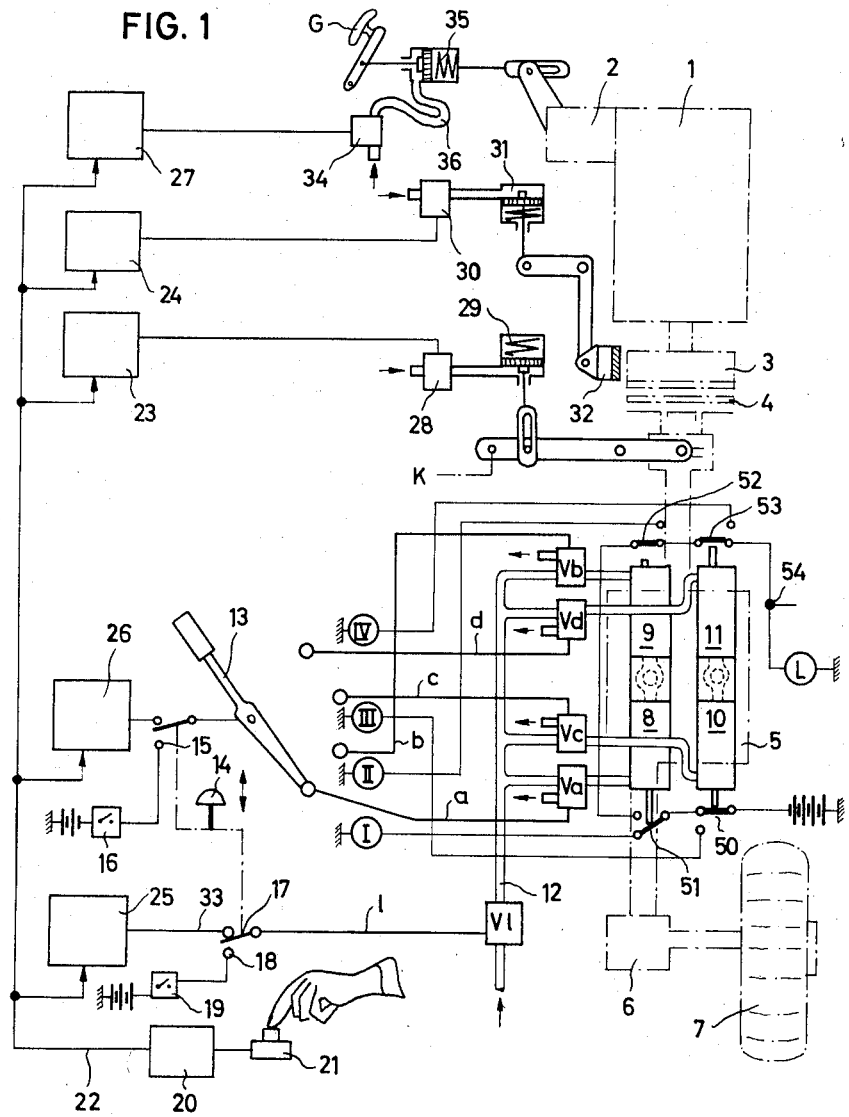

United States Patent

[11] 3,548,980

| [72] | Inventors | Karl Heinz Schmidt<br>Vorra;<br>Benno Bildat, Erlangen, Germany |
|---|---|---|
| [21] | Appl. No. | 798,906 |
| [22] | Filed | Feb. 13, 1969 |
| [45] | Patented | Dec. 22, 1970 |
| [32] | Priority | Feb. 16, 1968 |
| [33] | | Germany |
| [31] | | No. 1,655,210 |

[54] GEAR-CLUTCH-BRAKE-MOTOR CONTROLS FOR SYNCHRONIZED SHIFTING
10 Claims, 9 Drawing Figs.

[52] U.S. Cl. .................................................. 192/.09,
192/3, 192/3.5, 192/4; 74/339, 74/872; 317/141
[51] Int. Cl. ..................................................... F16h 57/10
[50] Field of Search ........................................... 192/4A,
3.5E, 3.5FE, 3.5FPE, 3.5FRE, .09; 74/339

[56] References Cited
UNITED STATES PATENTS

| 2,908,365 | 10/1959 | Zens et al. ..................... | 192/4A |
| 2,952,346 | 9/1960 | Costa et al. ..................... | 74/339X |
| 3,103,826 | 9/1963 | Jaeschke ......................... | 192/4AX |
| 3,478,851 | 11/1969 | Smyth ............................ | 192/3.5E |

*Primary Examiner*—Benjamin W. Wyche, III
*Attorneys*—John C. Holman and Marvin R. Stern

ABSTRACT: A device for the synchronized shifting of motor vehicle transmission gears from a lower to a higher gear utilizing a servodrive system with a predetermined timed characteristic for disengaging a clutch, synchronizing the speeds of the gears to be engaged by temporarily applying a brake to the engine drive shaft, shifting into neutral, reengaging the clutch, disengaging the brake, and shifting the gears as selected. The servodrive system is controlled by a signaling system having built-in operational timed characteristics, one of the major factors being that the brake application period is so timed that the ratio of the engine drive shaft speed before to after braking equals the ratio of the gears to be engaged. An additional refinement includes a further servodrive which automatically releases the accelerator pedal during the shifting operation, although this can be omitted and left to the operator.

FIG. 2
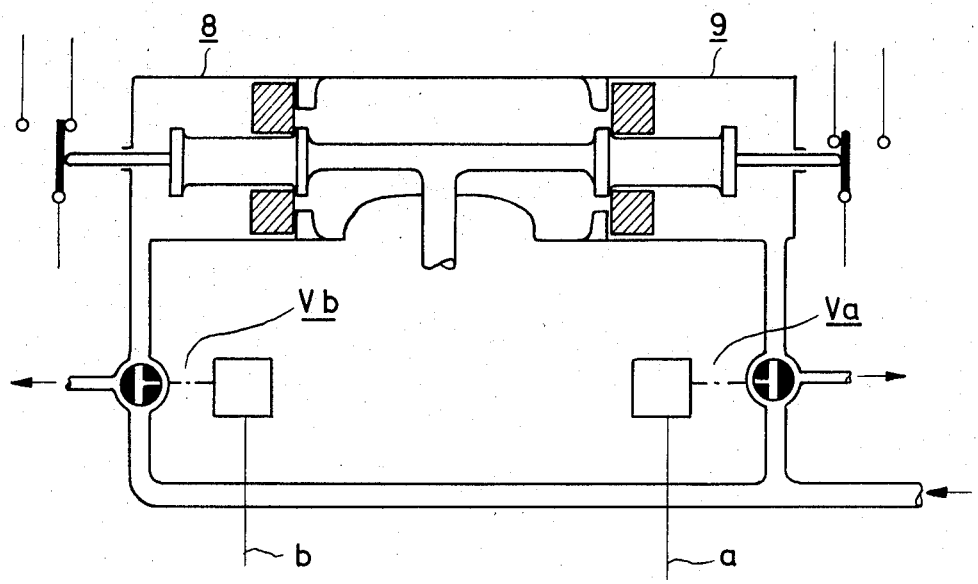
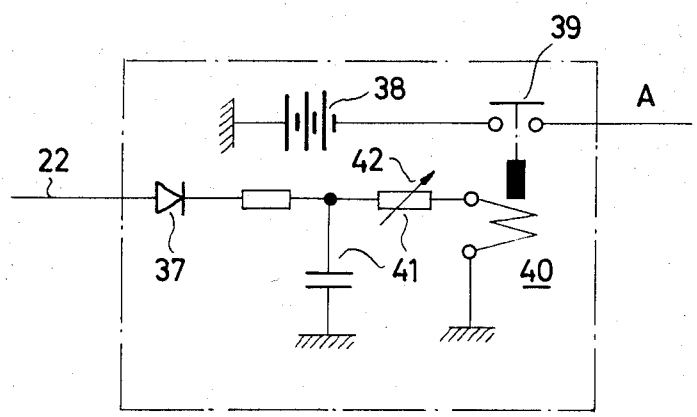
FIG. 4

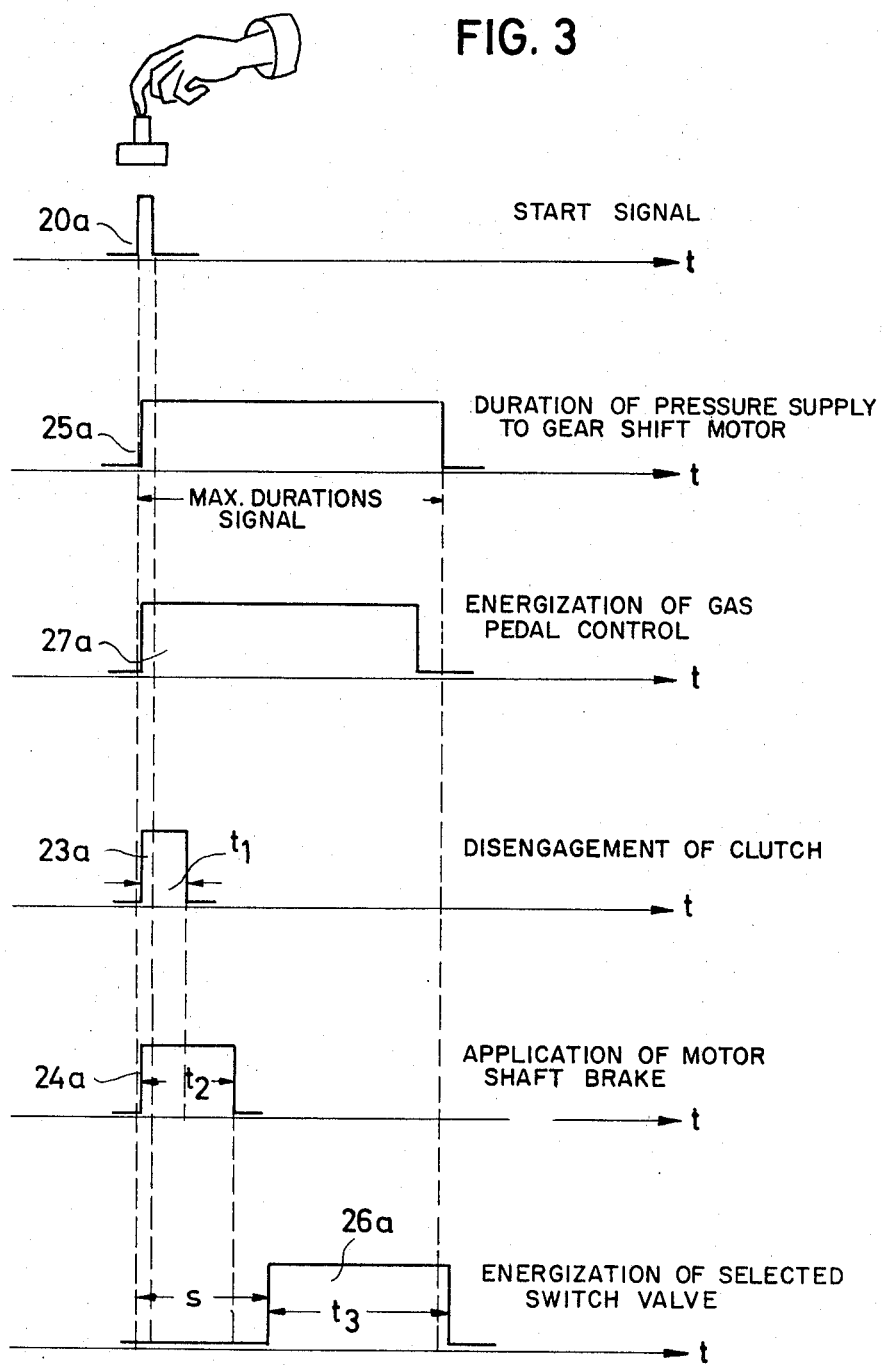

INVENTORS
K. H. SCHMIDT
B. BILDAT

BY Holman, Glascock,
Downing + Seebold
ATTORNEYS

GEAR-CLUTCH-BRAKE-MOTOR CONTROLS FOR SYNCHRONIZED SHIFTING

The present invention relates to the shifting of transmission in heavy motor vehicles.

In motor vehicles which are equipped with synchronized transmission, the drive performs a so-called intermediate coupling operation when shifting from a lower gear to a higher gear in order to establish the synchronism of the respective transmission parts of the next higher gear to be coupled by coupling the countershaft of the transmission briefly with the engine of the respective motor vehicle whose speed is rapidly diminishing.

This known operation of intermediate coupling during the shifting from a lower to higher gear permits only in the rarest cases the production of exact synchronism of the transmission parts to be coupled, since the necessary delay of the counter shaft of the transmission and the engine speed to be expected must be estimated by the driver. Furthermore, there is the difficulty in shifting upward that the intermediate coupling takes considerable time. In motor vehicles for shipping heavy loads and in cross-country vehicles which have to overcome a high traveling resistance, a great loss in speed occurs when changing from lower to higher gears, which can become so great that the engagement of the next higher selected gear takes place at a traveling speed with which it is no longer possible, or at least difficult, to accelerate the vehicle due to the resulting unfavorable engine speed.

The loss of traveling speed in heavy and/or cross-country vehicles during the shifting from lower to higher gears cannot be completely compensated by automatic devices for the synchronized shifting of transmissions, since the comparison of the speed between the inlet side and the outlet side of the transmission, necessary for the synchronization, requires considerable time.

The object of the invention, therefore, is to solve the problem of effecting the respective change from a lower gear to a higher gear in transmissions automatically during the synchronous run of the transmission parts to be coupled so rapidly that the vehicle does not suffer any substantial loss of speed during the shifting, even with a high traveling resistance.

For the solution of this problem the invention starts from a device for the synchronized shifting of transmissions in motor vehicles released by the driver and effecting a change from a lower to a higher gear, this gearshift drive having a control input for establishing the neutral position of the transmission and additional control inputs selected arbitrarily over a manually operated selector to engage the gears associated with the respective selector position.

Such a device is characterized according to the invention by an impulse transmitter, released arbitrarily by hand, as well as by signal transmitters connected with the impulse transmitter and released substantially simultaneously with the release of the impulse transmitter, of which a first transmitter serves to produce a signal immediately after its release which controls a servodrive for effecting a brief disengagement of the clutch of the respective vehicle, a second transmitter serves to produce a second signal immediately after its release which controls another servodrive for effecting actuation of a motor brake which lasts somewhat longer than the disengaged period of the clutch, and a third transmitter serves to produce a third signal likewise immediately after its release, which is fed to the control input or the gearshift drive to establish the neutral position of the transmission, and where finally a fourth transmitter serves to produce a fourth signal at the output side with a certain delay after the actuation of the motor brake is completed and being fed over the selector to the respective selected control input of the gearshift drive. The duration of the signal of the second control signal transmitter is so dimensioned and adjusted from the start to the completion of the motor brake actuation that the ratio of the speed of the engine before and after the actuation of the motor brake is equal to the ratio of the transmissions of those gears between which the gearshift is to be effected, and furthermore where all control signal periods are selected so short that the respective traveling speed of the vehicle does not change markedly in the time before the release of the impulse transmitter up to the engagement of the respective selected gear.

It should be explicitly pointed out that only a brief disengagement of the clutch is provided in the device for the disengagement of the previously effective gear, and that the engagement of the next higher gear is then effected with the clutch engaged, which is made possible by the fact that the engagement can be effected very precisely with a synchronous running of the transmission parts to be coupled.

According to a preferred embodiment of the invention, another control signal transmitter is provided, which is connected with the impulse transmitter and is released simultaneously with the other control signal transmitters, and which emits a signal immediately after its release which lasts at least until the respective preselected gear has been engaged, this signal effecting actuation of the servodrive locking mechanism for a desired period to prevent the driver from actuating the fuel supply regulating mechanism during such period.

While the driver must thus release the foot pedal during the shifting operation in the first described principal embodiment of the device according to the invention in order not to disturb the effectiveness of the motor brake within the actuation period assigned to it, this release of the gas pedal is enforced automatically by a servodrive according to the just indicated preferred embodiment of the invention.

Figure 5:
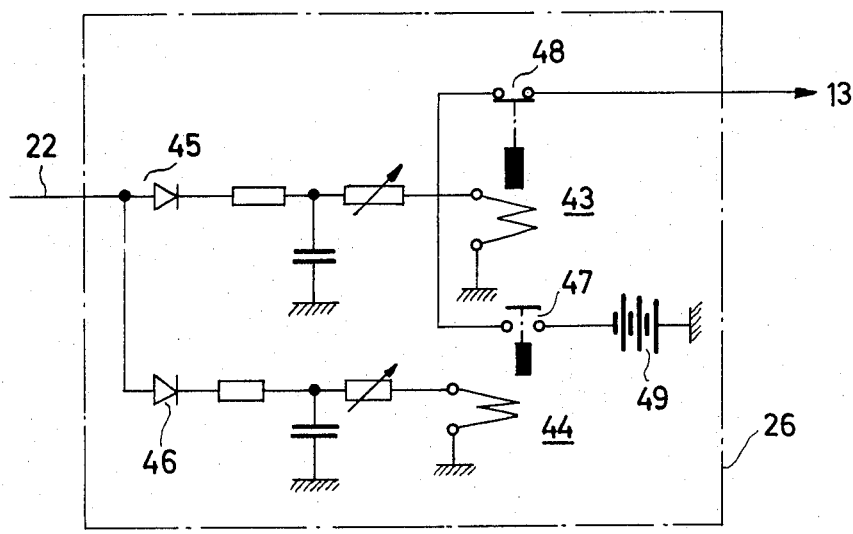
Figure 6:
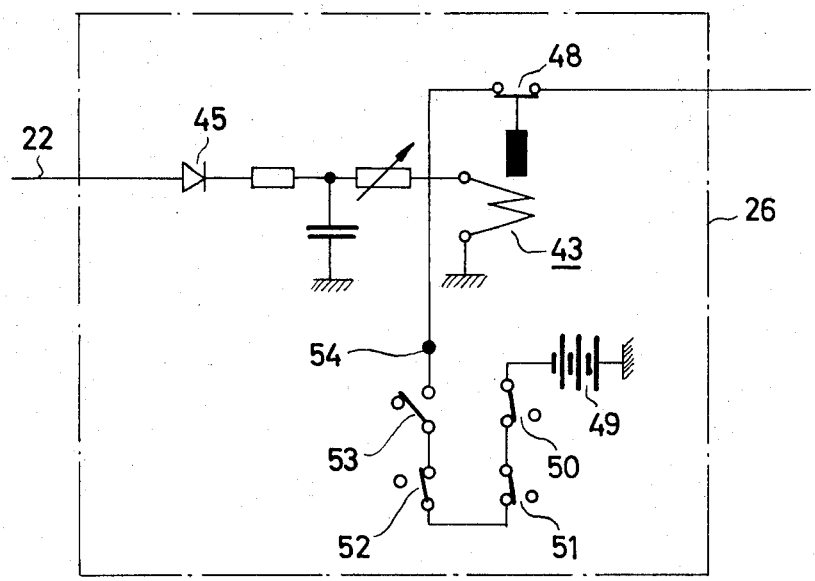
Figure 7:
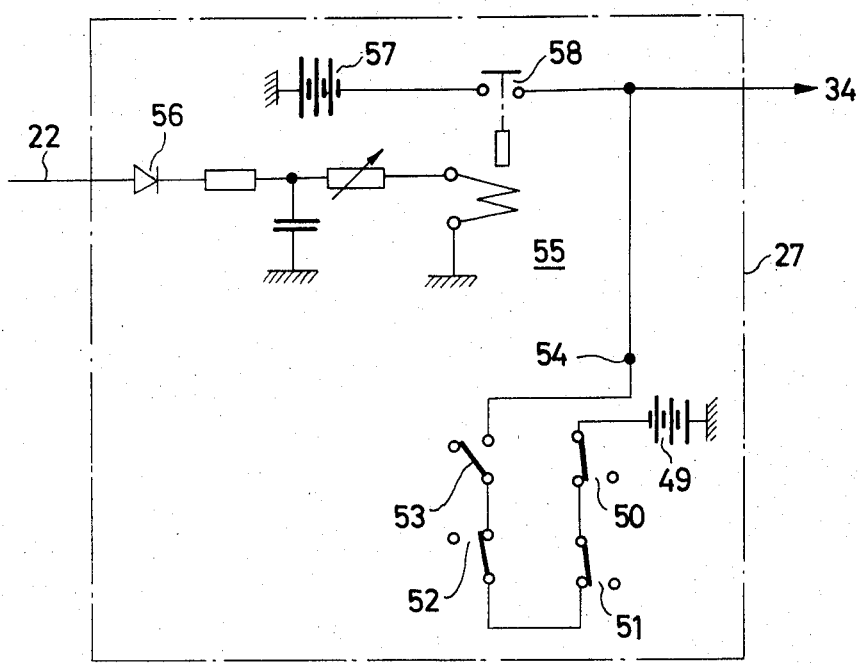
Figure 8:
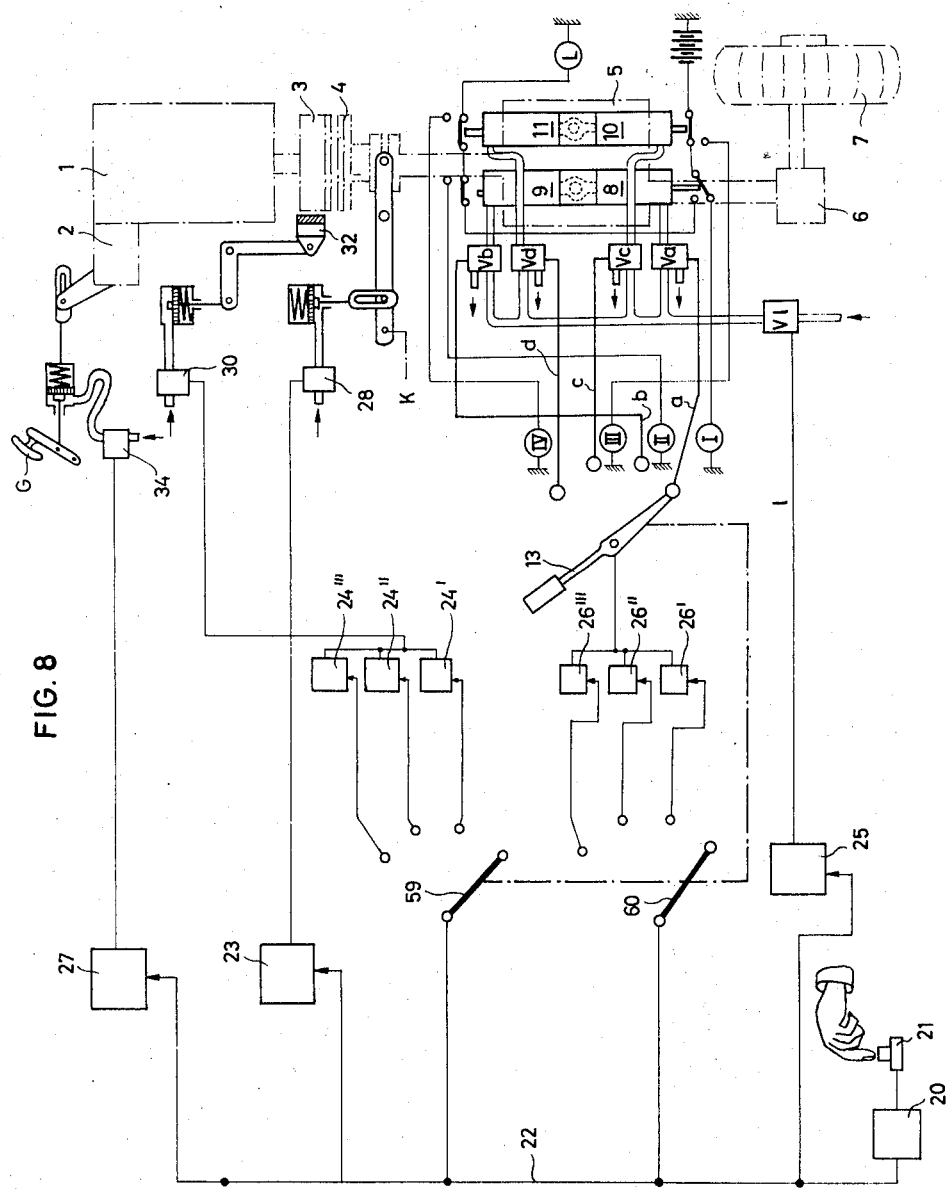
Figure 9:
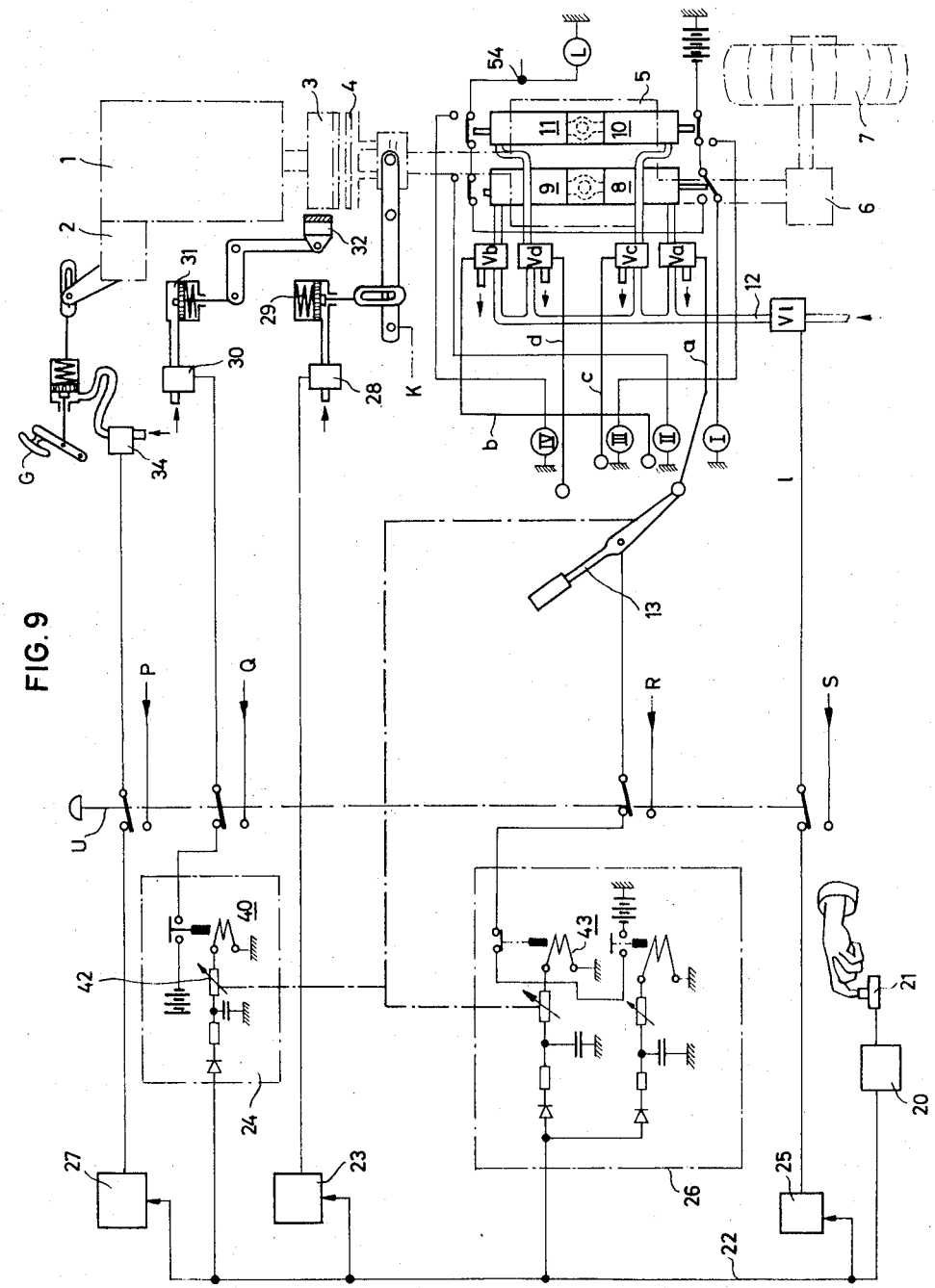

The invention will be described below more fully by the description of some embodiments with reference to the attached drawings, and in which drawings:

FIG. 1 shows a wiring diagram of a device according to the invention, partly as a block diagram, FIG. 2 shows a detail of the shifting device represented in FIG. 1, FIG. 3 shows time diagrams for comparison of the time operating characteristics of the various control processes during the operation of the arrangement represented in FIG. 1, FIG. 4 shows a possible embodiment of control signal transmitters for the device according to FIG. 1, FIGS. 5 and 6 shows two possible embodiments of a special control signal transmitter used in a device according to the invention, FIG. 7 shows another possible embodiment of a signal control transmitter according to the invention, and FIGS. 8 and 9 show similar embodiments of the shifting device as represented in FIG. 1, but for the shifting of transmissions with different grading of the transmission ratios.

Corresponding parts are provided in the drawings with identical reference numerals.

FIG. 1 shows in broken lines a motor vehicle engine 1, the output of which can be controlled by means of a fuel pump 2 from a gas pedal G. The engine 1 is connected through a flywheel 3 and a clutch 4 to a transmission 5 which is coupled by a differential 6 to a set of drive wheels for the vehicle, of which one wheel 7 is illustrated. The transmission has, in the embodiment represented here for the purpose of illustration, four selectively engageable forward gears, the actuation of the shifting sleeves of this transmission being effected by means of four pressure medium drives 8, 9, 10, and 11, opposing each other in pairs which form the gearshift drive or the device. The gear shift drive has altogether five control inputs, which have, in the embodiment represented in FIG. 1, the form of electric control lines 1, a, b, c, and d, which are respectively connected to electromagnetically operated control valves V1, Va, Vb, Vc, and Vd. If the control line 1 is excited, pressure medium flows into the pressure medium duct 12 and, if none of the control lines a to d is excited, from there to the pressure medium drives 8 to 11. This admission of all pressure medium drives with pressure medium leads to the establishment of an idling position of the transmission with disengagement of the respective previously effective gear. If a certain gear is then to be engaged, a corresponding input a, b, c, or d is excited, so that the supply of pressure medium to the respective pressure medium drive is interrupted and the latter is connected with a vent breather, as indicated by corresponding arrows in the vicinity of the vent breathers of the valves Va to Vd.

To facilitate the understanding of the method of operation of the gearshift drive used in connection with the present embodiment, the two pressure medium drives 8 and 9 with the respective electromagnetic control valves Va and Vb are represented in FIG. 2 of the drawings in detail. It should be pointed out that gearshift drives of this type are in themselves known, so that a description of the method of operation, which can be seen in FIG. 2, is not given. While in the above-described embodiment compressed air is used as a pressure medium for the operation the gearshift drive, hydraulic gearshift drives can naturally also be used, which likewise have a control input for actuating the gearshift drive to establish the idling position of the transmission and additional control inputs at the excitation of which a certain gear is engaged.

The release of the control signals for the excitation of a certain input of the gearshift drive to engage a certain gear associated with this input is effected by means of a selector 13 which is actuated by the driver. During the down-shifting the selector 13 is connected by corresponding actuation of a pushbutton 14 which connects a contact 15 with a signal source 16 which can be actuated at will by the driver, for example, by pressing down briefly a key, so that a certain control input of the gearshift drive is excited corresponding to the previous position of the selector 13 set by the driver. As can likewise be seen from FIG. 1, a switch 17 is also coupled with the pushbutton 14, over which the control line 1 can be connected with a contact 18 and over the latter with a signal source 19, which latter is likewise released arbitrarily by the driver, which can be effected, for example, simultaneously with the actuation of the clutch pedal.

For shifting from a higher to a lower gear, the driver selects first the desired gear by means of the selector 13 and then actuates the clutch mechanism K to disengaged position, then connecting the signal source 19 to line 1, thereby impressing a control signal on the control line 1. This causes the gearshift drive to shift the transmission 5 into idling position. The driver now connects the signal source 16 so that a certain control input a or b or c or d of the gearshift drive is excited, corresponding to the selected position of the selector 13, and the selected gear is engaged.

FIG. 1 also shows an impulse transmitter 20 which, as indicated at 21, can be released at will by the driver and when operated emits a short voltage signal or pulse to a line 22 represented as 20a in FIG. 3.

The impulse transmitter can be formed either by a wiper relay or by a monostable multivibrator.

From the line 22 the release signal 20a passes to the control signal transmitters 23, 24, 25, and 27.

As soon as a release signal 20a reaches the control signal transmitter 23, the latter emits a control signal 23a, whose duration and time position with respect to the release signal 20a can be seen from FIG. 3, to an electromagnetic control valve 28, which releases for the duration of the control signal 23a the pressure medium supply to a servodrive 29 so that the clutch 4 is disengaged for the duration of the signal 23a.

As soon as a release signal 20a arrives in the control signal transmitter 24, the latter emits a control signal 24a, FIG. 3, which starts simultaneously with the signal 23a but which lasts longer than the latter, to an electromagnetic control valve 30 which releases for the duration of the signal 24a the pressure medium supply to a servodrive 31, so that a brake 32 bears on the flywheel 3 of the engine for the duration of the signal 24a.

When a release signal 20a reaches the control signal transmitter 25, the latter emits a control signal to a line 33 which is connected, with the pushbutton 14 moved upward, through the switch 17 with the control line 1, so that the gearshift drive is admitted with pressure medium in the sense of establishing the idling position of the transmission. It can be seen from FIG. 3 that the duration of the control signal 25a fed by the control signal transmitter 25 and thus the duration of the admission of the gearshift drive with energy is so selected that it is at least equal to the respective longest duration of the gear change to be expected.

When furthermore a release signal 20a reaches the control signal transmitter 26 it starts in the latter a delay time s, FIG. 3, after which the control signal transmitter 26 emits a control signal 26a to the selector 13, which transmits the control signal to the respective selected control input of the gearshift drive.

When a release signal 20a reaches the control signal transmitter 27 the latter emits the control signal 27a, FIG. 3, which starts substantially simultaneously with the release impulse 20a and, similar to the signal 25a, corresponds to the duration of the gear change. The control signal 27a energizes an electromagnetic valve 34 which releases, for the duration of the signal 27a, a pressure medium supply to a pressure medium cylinder 35 forming part of an operating linkage between an accelerator gas pedal G and a fuel pump 2 of the engine 1. It can also be seen from FIG. 1 that the operating linkage contracts when pressure medium is supplied to the pressure medium cylinder 35 through a flexible line 36 so that actuation of the fuel pump from the gas pedal G is not possible for the duration of the control signal 27a.

If the driver wants to shift upwards from lower to higher gears, he pulls the button 14 up, or allows it to move up, so that the selector 13 is disconnected from the signal source 16 and is connected to the control signal transmitter 26 and the control line 1 is disconnected from the signal source 19 and is connected to the control signal transmitter 25. The driver then actuates the impulse transmitter 20 and the shifting process then takes place automatically at high speed. The invention is based on the idea that the ratio of the engine speeds, on the one hand, before and, on the other hand, after the gear change is equal to the ratio of the transmissions of the respective gears, if care is taken that the traveling speed does not change during the gear shift.

It was found that after the disengagement of the previously effective higher gear, the engine and the countershaft of the transmission coupled with it can be slowed down by exact timing of the engagement of a motor brake so that at the end of the engagement time of the motor brake the synchronous running of the transmission parts to be coupled for the engagement of the next lower gear is achieved if the slowing down of the engine and of the countershaft can be effected so rapidly that the traveling speed of the vehicle has not changed markedly.

The duration $t1$ of the control signal 23a and thus the duration of the disengagement of the clutch is so short that the transmission 5 is just relieved sufficiently of the effective tongue for the establishment of the idling position of the transmission. At the end of the time interval $t1$, the countershaft of the transmission is again coupled with the engine, which has already been slowed down in the meantime for the duration $t2$ of the control signal 24a by the engagement of the motor brake and is further slowed down to the end of the signal time $t2$, this signal time being adjusted in the above-described sense with great accuracy. After the completion of the control signal 24a, the transmission parts to be coupled run synchronously, and since the delay time $s$ of the control signal 26a expires immediately at the end of the control signal 24a, the engagement of the selected gear can now be effected with synchronization of the transmission parts to be coupled and with the clutch engaged.

The control signal transmitters 23, 24, 25, and 27 can be formed either by monostable multivibrators or by circuits of the type indicated in FIG. 4. According to FIG. 4, the above-mentioned control signal transmitters are connected through a diode valve 37 to the signal line 22. The respective required control signal 23a, 24a, 25a, and 27a respectively is produced by connecting a voltage source 38 with an output line A over a set of contacts 39 of a holding relay 40 in a certain time sequence, the energizing circuit 41 of which may be built in a known manner and can be adjustable, as indicated at 42, to provide the desired holding time.

FIG. 5 shows an embodiment of the control signal transmitter 26. In this embodiment of the control signal transmitter 26, two holding relays 43 and 44 are connected over blocking diodes 45 and 46 respectively to the signal line 22. The holding relay 44 has a set of contacts 47, while the holding relay 43 has a set of contacts 48. The above-mentioned two contact sets are connected in series as well as to a voltage source 49, on the one hand, and to the line leading to the selector 13, on the other hand. The holding time of the holding relay 44 corresponds to the sum of the delay time s and of the signal time t2 of the control signal 26. The holding relay 44 forms thus in connection with the battery 49 a current source giving off energy substantially only for the duration of the shifting process. Such a current source, giving off energy only for the duration of the shifting process, can also be formed, according to the modified embodiment represented in FIG. 6, by a series connection of double-throw switches 50, 51, 52, and 53 connected to a current source 49 which can be a part of a gear indicator indicated in FIG. 1. The actuation of the double-throw switches is effected by operating plungers of the gearshift drive, as can be seen from FIGS. 1 and 2. If the transmission is in neutral position, the voltage source 49 is connected over the series connection of contact sets of the double-throw switches 50, 51, 52, and 53 with a terminal 54 which, in turn, is connected to the contacts of the holding relay 43.

It should be pointed out that the respective end of the control signal 25a and 26a respectively depends on the design of the gearshift drive used. In the present example a gearshift drive is used where the excitation of the control input effecting the engagement of the desired gear last longer than the admission of pressure medium effecting the establishment of the neutral position of the transmission, as can be readily seen from an observation of the method of operation of the arrangement represented in FIG. 2. However, if different gearshift drives are to be used, correspondingly different times are obtained for the end of the control signal 25a and the end of the control signal 26a, as will be readily understood by those skilled in the art.

FIG. 7 shows an embodiment of the control signal transmitter 27. This control signal transmitter has a holding relay 55 which is likewise connected over a blocking diode 56 to the signal line 22. The holding time of the holding relay 55 is so selected that a current source 57 is connected with the control valve 34 for a time which is just sufficient for its excitation. The line leading to the control valve 34 is also connected to the terminal 54 which forms the output side of the above-mentioned series connection of the double-throw switches 50, 51, 52, and 53.

The embodiment of the invention described in connection with FIG. 1 is suitable for the accelerated upward-shifting of transmissions which have a constant grading or relative speed change of the transmission ratios. Accordingly, a constant engagement time of the motor brake is provided in the control signal transmitter 24 by corresponding dimensioning of the switching time of the multivibrator and by corresponding adjustment respectively of the holding time of the holding relay. However, if the grading of the transmission ratios of the transmission to be shifted is not regulated, the engagement time of the motor brake and thus the signal time of the control signal 24a must be varied and correspondingly also the delay time s of the control signal 26a, in dependence upon the respective desired gear change. A signal transmitter according to the invention meeting these requirements is represented in FIG 8 of the drawings.

As can be seen from FIG. 8, the control signal transmitter 24 is provided to this end with several signal transmitter segments 24', 24'', 24''', which are all connected between the electromagnetic control valve 30 provided for actuating the motor brake 32 and the signal line 22 through double-throw switch 59. In a corresponding manner the control signal transmitter 26 has individual signal transmitter segments 26', 26'', 26''', which are all connected between the selector 13 and selectively through a double-throw switch 60 to the signal line 22. The double-throw switches 59 and 60 are mechanically coupled with the selector 13 so that, when the selector 13 is shifted in the sense of performing a desired gear change, those signal transmitter segments 24 and 26 are automatically applied to the signal line 22 which yield a duration of the motor brake actuation and a length of the delay time s which are associated correspondingly to the foregoing considerations of the characteristic ratio of the transmissions at the respective selected gear change.

Instead of the embodiment of the control signal transmitter 24 and 26 represented in FIG. 8, these circuit parts can also have a different form than indicated in connection with FIGS. 4 and 5 of the drawings. In this case, the resistances of the holding relay 40 of the control signal transmitter 24 and of the holding relay 43 of the control signal transmitter 26 serving to adjust the holding time are coupled positively instead of the double-throw switches 59 and 60 with the selector 13 in the manner shown in FIG. 9, so that when the selector lever 13 is shifted for the preselection of a desired gear change a corresponding adjustment of the actuating time of the motor brake end of the delay time s takes place.

In FIG. 9 there is also indicated a reversing switch U, whose lower part serves to disconnect the valve V1 from the control signal transmitter 25 and to disconnect the counter 13 from the control signal transmitter 26 and it is identical with the switching means indicated in FIG. 1, which can be reversed by actuating the button 14. The contact sets of the reversing switch U shown in the upper part of FIG. 9 serve to disconnect the control signal transmitter 24 from the control valve 30 and to disconnect the control signal transmitter 27 from the control valve 34. The above-described reversing switch U serves for the selective switching from the shifting device according to the invention to an automatic shifting device, illustrated by way of example, which is used during the down-shifting where a control signal arbitrarily released by the driver through an input S and the bottom contactor of the reversing switch U, passes over line 1 to the gearshift drive valve V1 and causes the latter to establish the idling position of the transmission. At the same time a blocking signal produced in a signal transmitter is fed over the input P to the valve 34 so that the driver cannot manually control the fuel supply to the engine for the duration of the gear-shifting process.

Measuring instruments now compare the speeds on the input side and on the output side of the transmission, and by means of a test circuit is determined whether the synchronous running of the transmission parts to be coupled has been achieved, which is established, if necessary, automatically by actuating the motor brake 32 over the control valve 30 from an input Q. With synchronous running of the transmission parts to be coupled, a control signal is produced in the above-mentioned test circuit which is transmitted to the input R and the selector 13 in the gearshift drive. The design of such an automatic gearshift device, which can be connected instead of the shifting device according to the invention, can naturally be effected in various ways.

We claim:

1. A device for the synchronized shifting of transmissions in a motor vehicle having a clutch for coupling an engine drive shaft to a change-speed gear transmission for effecting a change from a lower gear ratio to a higher gear ratio comprising a gearshift drive releasable by a driver and having a control input for establishing a neutral position of the transmission and additional input control means, a manually operable selector having a plurality of positions for selecting the input control means for the engagement of the different gear ratios associated with the respective selector positions, characterized by a manually operable main impulse transmitter, a plurality of control signal transmitters connected to the manually operable main impulse transmitter for transmitting respective control signals substantially simultaneously with the transmittal thereto of a main impulse, a servodrive responsive to a control signal for disengaging said clutch for a predetermined time, one of said control signal transmitters being connected to produce a signal substantially immediately after receiving a main impulse and connected to said clutch servodrive for controlling the operation thereof, an engine drive shaft brake having a servodrive actuator, a second of said control signal transmitters connected to produce a signal substantially immediately after receiving a main impulse and connected to said brake servodrive for controlling the application thereof for somewhat longer than the disengagement of the clutch by said clutch servodrive, a gearshift having a control input and a plurality of gear engaging positions and a neutral position, a third of said control signal transmitters connected to produce a signal substantially immediately after receiving a main impulse and connected to said gearshift for actuating it to neutral position, a fourth of said control signal transmitters connected to produce a signal with a predetermined delay after completion of the actuation and release of said brake and connected by said selector to a selected one of said input control means of the gearshift drive, and further where the duration of the signal time of said second control signal transmitter up to the completion of the actuation and release of said brake is so dimensioned that the ratio of the speeds of the engine drive shaft before and after the actuation of said brake is equal to the ratio of the transmissions of those gears which are to be engaged, and where furthermore all control signal times are so short that the respective vehicle traveling speed does not change markedly in the time from the initial operation of the main impulse transmitter up to the engagement of the respective selected gears.

2. A device according to claim 1, including a controllable engine fuel supply regulating mechanism, a blocking mechanism having a servodrive for preventing the driver from actuating said fuel supply regulating mechanism, and a fifth control signal transmitter connected with said main impulse transmitter for energization simultaneously with the other of said control signal transmitters and connected to produce a signal substantially immediately after receiving a main impulse and lasting at least until the respective selected gears have been engaged and connected to energize said locking mechanism for the duration thereof.

3. A device according to claim 1 for shifting transmissions in motor vehicles with constant grading of the transmission ratios of the various gears, characterized in that the second control signal transmitter serving to actuate the motor brake is set to a constant signal time duration, and that the delay time of the fourth control signal transmitter up to the start of the control signal transmitter is also constant.

4. A device according to claim 1 for shifting transmissions in motor vehicles with varying grading of the transmission ratios of the individual gears, characterized in that the selector is so connected with the second control signal transmitter and with the fourth control signal transmitter that the signal time of the second control signal transmitter determining the respective duration of the actuation of the motor brake, and the delay time of the fourth control signal transmitter up to the start of the control signal therefrom to the corresponding input control of the gearshift drive determining the time for engagement of the respective selected gear is positively adjustable responsive to the respective gear ratio selection by said selector.

5. A device according to claim 4, characterized in that the second and the fourth control signal transmitters have several signal transmitter segments corresponding to the number of different transmission grades of the respective transmission which have different signal times and delay times respectively, and which are connected to common outputs, said signal transmitter segments being selectively connected with said main impulse transmitter by double-throw switches operably coupled with said selector.

6. A device according to claim 5, including a current source and characterized in that the control signal transmitters and the signal transmitter segments comprise holding relays connected for energization by said main impulse transmitter, the holding relays of the first, second, and third control signal transmitters each having contacts for connecting said current source to the respective servodrive and gearshift drive, a second current source, and said fourth control signal transmitter holding relay has contacts for connecting said second current source to said control input of the gearshift drive only during the gear-shifting period.

7. A device according to claim 6, characterized in that said second current source comprises a holding relay energized by said main impulse transmitter and having a holding time corresponding to the respective duration of the gear-shifting process and has contacts connected in series with contacts of said fourth control signal transmitter holding relay.

8. A device according to claim 6, characterized in that a number of switches are associated with the respective gears and are operably connected by actuating means coupled with said gearshift drive for actuation, during the setting of the neutral position of the transmission, into a switching position in which said second current source is connected through a series connection of said switches to the contacts of the fourth control signal transmitter holding relay.

9. A device according to claim 2, characterized in that said fifth control signal transmitter includes a holding relay having a holding time ending before the respective selected gear is engaged, and contacts of this latter holding relay are also connected to said second current source.

10. A device according to claim 1 having a signal source, and a manually operable switch for the selective connection of said selector and of said gearshift drive control input to either the respective control signal transmitter therefor or with said latter signal course.